Patented Oct. 17, 1933

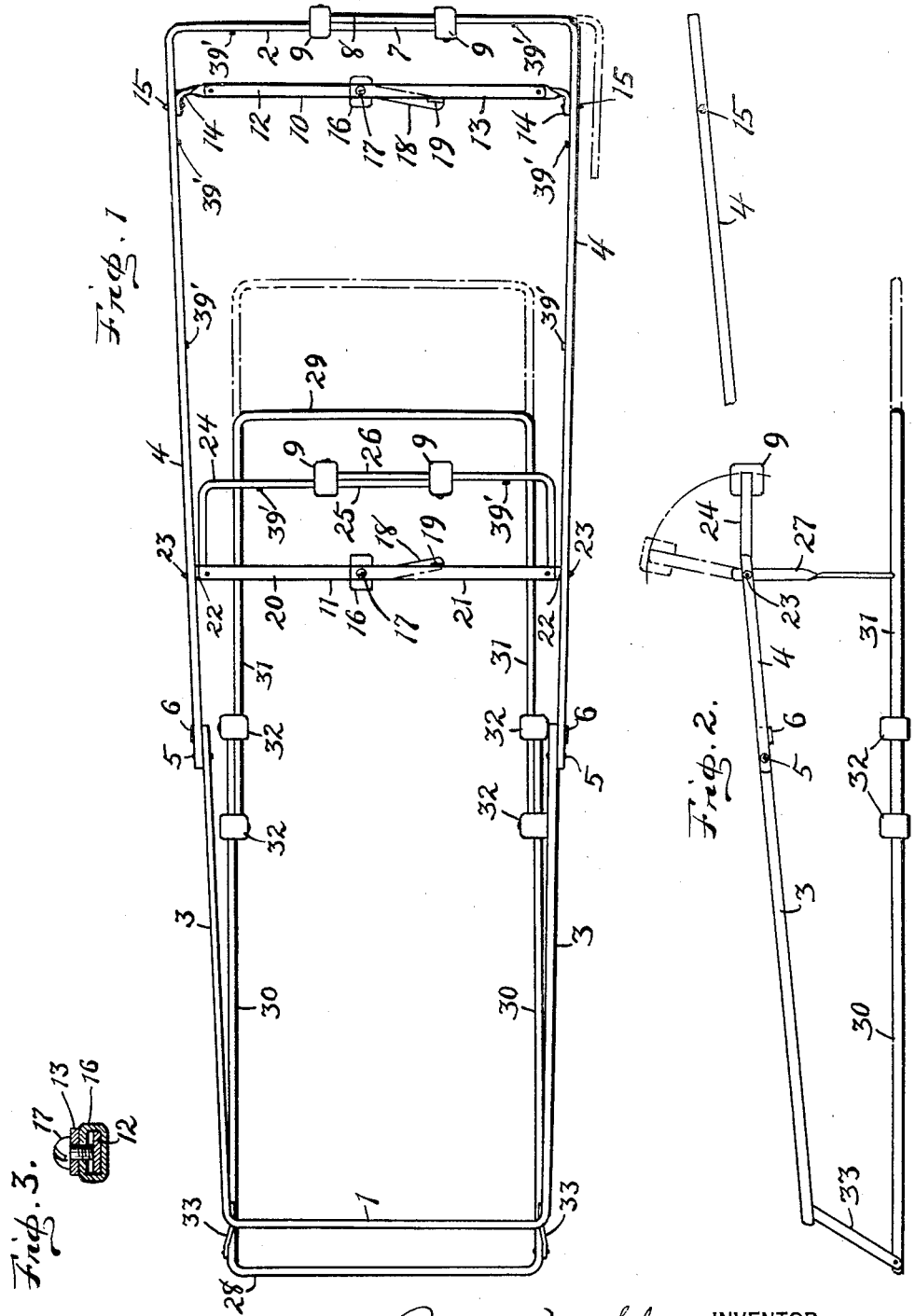

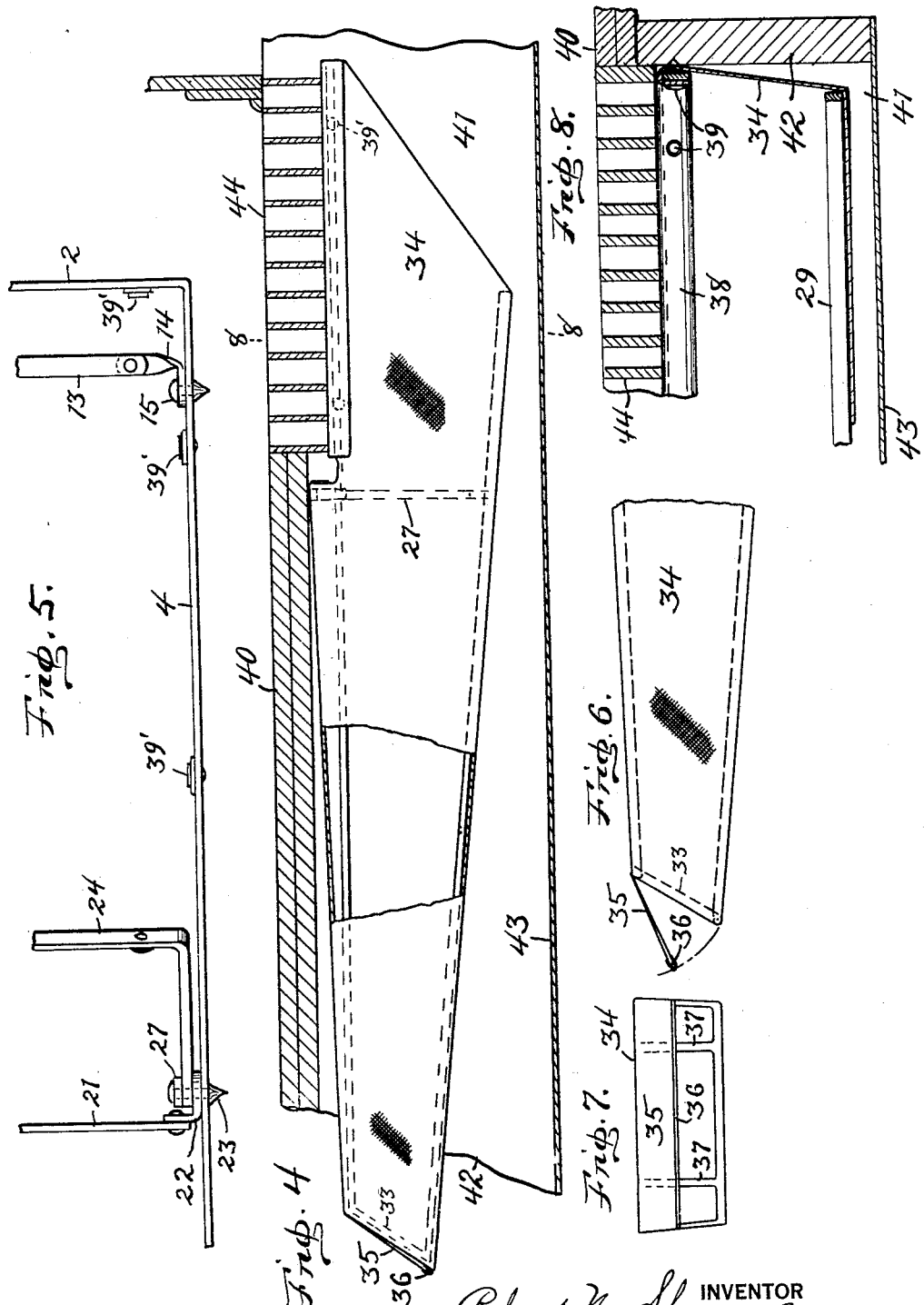

1,930,777

UNITED STATES PATENT OFFICE 1,930,777

DUST ARRESTER FOR AIR DUCTS

Robert N. Shoner, Fort Wayne, Ind.

Application April 20, 1931. Serial No. 531,397

4 Claims. (Cl. 183—51)

This invention relates to improvements in dust arresters for air ducts such as are applicable to passageways for air that circulates therethrough between a hot air furnace and rooms of a building that are heated thereby. An object of the invention is to provide a filter bag and means for its support constructed so that it may be readily inserted in and removed from the usual air duct provided with a register through which air passes from a room into the heating chamber of a furnace, or vice versa. Another object is to so construct the support for the sack that it may readily be introduced into an air duct and secured in position therein upon removal of the register.

Other objects and advantages of the invention will appear hereinafter.

An illustrative embodiment of the invention is shown in the accompanying drawings, in which:—

Fig. 1 is a plan view of a frame for supporting the air filter sack;

Fig. 2 is a side elevation projected from Fig. 1, a portion being broken away;

Fig. 3 is a detail showing a cross section of an adjustable connection for the toggle bars;

Fig. 4 is a side elevation of a structure embodying the invention positioned in an air duct, portions being in section and broken away;

Fig. 5 is a fragmentary plan view of the support for the sack;

Fig. 6 is a fragmentary side view showing one end of the filter sack;

Fig. 7 is a rear end view projected from Fig. 6; and

Fig. 8 is a fragmentary transverse section of Fig. 4 on the line 8—8 thereof.

The illustrative embodiment of the invention consists of a sack supporting frame having upper and lower members. The upper member is formed by two U-shaped parts 1 and 2, the respective side arms 3 and 4 of which overlap and are pivotally connected together as indicated by 5, the extreme ends of the side arms 3 having corresponding lugs 6 that extend outwardly beneath the side arms 4 so that swinging movement of the parts 1 and 2 relative to each other are thereby limited so that the part 1 will be sustained in a plane common with that of part 1 when the sack support is in operative position.

The forward end of the part 2 has overlapping portions 7 and 8, each of which has fixed upon its end a slotted guide 9 through which the opposite portion extends and has sliding movement so as to permit lateral adjustment of the side arms 4 of the part 2 relative to each other.

The side arms 4 are connected together by a pair of toggles 10 and 11 spaced apart. The toggle 10 consists of a pair of bars 12 and 13 the outer ends of which are pivoted to corresponding brackets 14 that are attached to the side arms 4 of the part 2 by means of rivets 15, the outer ends of said rivets being pointed. The inner end of the bar 13 has secured thereon a slotted lug 16 by means of a screw 17, and the bar 12 extends through the slotted lug 16 and is adjustably slidable therein and secured in adjusted position by means of said screw 17 when the latter is tightened. Also, the bar 12 has an extension 18 provided with a lug 19 at its outer end that has contact with the side of the bar 13 and thereby limits pivotal movement of the bars 12 and 13 with respect to the axes of the screw 17. The toggle 11 is similar to the toggle 10 and consists also of a pair of bars 20 and 21 adjustably connected together by another slotted lug 16 and screw 17, the bar 20 having an extension 18 and stop lug 19. The outer ends of the bars 20 and 21 are pivotally secured by corresponding brackets 22 to the side arms 4 of part 2, said brackets being attached to said arms by means of rivets 23 the outer ends of which are pointed, said brackets being loosely secured upon said rivets so as to permit turning movement of the toggle 11 upon the axes thereof. Upon said rivets 23 is pivotally mounted a U-shaped support 24 formed of two overlapping members 25 and 26 upon the ends of which members are secured corresponding slotted guides 9 through which the other member has sliding movement so that said support is adjustable with respect to its width, and also may be swung upwardly upon the axes of said rivets. Upon each rivet 23 is pivotally mounted a prop 27 hereinafter referred to.

The lower member of said sack supporting frame consists of two U-shaped parts 28 and 29, the respective side arms 30 and 31 of which overlap, and upon the end of each of said side arms is secured a slotted guide 32 through which the corresponding other side arm has sliding movement so that the said parts 28 and 29 of the lower member may be longitudinally adjusted with respect to each other. The part 28 is pivotally connected at its rear end to brackets 33 that are rigidly secured to the corresponding outer end of the part 1 of the upper frame so that the lower frame has swinging movement toward and from the upper frame. The props 27, when in supporting position, bear upon the side arms 31 of the part 29 and serve to sustain the upper and lower members spread apart.

A filter sack 34 formed preferably of loosely woven fabric is disposed upon the sack supporting frame. The rear end of the sack is closed by a flap 35 that is secured along its upper edge to the top of the sack, its lower edge being provided with a strip 36 of metal that serves as a weight which tends to hold the flap in closed position over the opening in the end of the sack. Also, several straps 37 connecting the bottom and top of the sack between the sides thereof are provided to prevent spreading apart of the top and bottom thereof. The forward end portion of the sack has an opening in its top and is provided about the margins of the opening with reinforcing bands 38 provided with snap fasteners 39 adapted to be folded upon the part 2 of the upper member of the sack supporting frame and the U-shaped support 24 and secured thereto by connecting said snap fasteners with corresponding fasteners 39' thereon. By adjusting the part 29 of the lower member forwardly and placing the props 27 in supporting position the walls of the sack are thereby stretched and held taut.

The appliance is positioned beneath the floor 40 in a duct 41 which may be conveniently formed beneath the floor and adjacent joists 42 upon which the floor is supported by securing a plate 43 to the bottom edges of said joists so as to close the space therebetween. The forward upper end of the appliance is disposed beneath the register 44 which is of the usual structure placed in an opening in the floor to provide a guarded passageway into the air duct 41. Thus, when the appliance is in position and air is drawn from the room through the register and the duct, it is caused to pass through the filter sack whereupon the air is relieved of its contained dust which is retained in the sack and is thereby prevented from reaching the heating chamber of the furnace. The furnace is not shown as it may be such as is ordinarily used in any suitable type of air heating equipment that includes cold and hot air ducts through which circulation of air occurs.

The flap 35 is normally held in closed position by its weight 36 and serves as a valve which will permit the passage of air through the rear end of the sack in the event of excessive pressure caused therein as by a sudden inflow and it also prevents the dust accumulated in the sack from igniting by back-fire from the heating chamber of the furnace.

As a means to facilitate the installing of the appliance the parts of the upper member are pivoted together and the parts of the lower member are longitudinally adjustable so that the supporting frame may be folded to permit its insertion in the duct upon removal of the register. In securing the supporting frame in position the toggles are manipulated so that the side arms 4 of the upper member are drawn toward each other so as to admit insertion of the upper member between the joists 42. The arms 12 and 20 of said toggles are then adjusted in the corresponding slotted lugs 16 and secured by the screws 17 so that when the toggles are replaced in normal position the side arms 4 of the upper member are thereby spread apart and the pointed ends of the rivets 15 and 23 are pressed into the joists through the overlying portions of the sack. In this manner the appliance is held firmly in position.

The part 1 of the upper frame member is narrower than part 2 thereof, and the lower frame member is narrower than the upper member. Therefore, when the sack is supported on the frame and the appliance is secured in operating position within the duct, the walls of the sack are held suspended and out of contact with the walls of the duct and extend respectively in planes spaced from the surrounding walls of the duct a sufficient distance as to permit air after filtering through the sack to pass freely between the exterior walls of the sack and the interior walls of the duct.

In the event the meshes of the fabric structure, constituting the sack, becomes clogged and the normal passage of air through the walls of the sack is thereby prevented, the circulation of air through the heating system is not thereby estopped entirely because of the flap valve 35 which is raised automatically by the draft of cold air as it is drawn from the sack through the rear end thereof which is opened more or less as the flap valve is raised.

I claim:

1. In apparatus of the class described, a filter bag supporting frame having upper and lower members, each having U-shaped parts oppositely disposed, the parts of said upper member being connected so as to have limited pivotal movement relative to each other, the parts of said lower member being connected slidably so as to be longitudinally adjustable relative to each other, brackets secured rigidly to the rear end of said upper member pivotally connected with the corresponding end of said lower member, adjustable means in connection with the opposite end of said upper member for expanding the sides thereof laterally; props connected with one of said members and engageable with the other member for spreading said members apart from each other; a U-shaped support adjustable as to its width pivotally connected with the sides of said upper member, pointed rivets extending outwardly from each side of said upper member adjacent said expanding means and U-shaped support, and a filter sack supported by said frame, the upper forward portion of said sack being open, and the opposite end of said sack having a valvular flap normally closing the rear end of the sack.

2. In apparatus of the class described, a filter bag supporting frame having upper and lower members, each having U-shaped parts oppositely disposed, the parts of said upper member being connected so as to have limited pivotal movement relative to each other, the parts of said lower member being connected slidably so as to be longitudinally adjustable relative to each other, brackets secured rigidly to the rear end of said upper member and pivotally connected with the corresponding end of said lower member, adjustable means in connection with the opposite end of said upper member for expanding the sides thereof laterally; props connected with one of said members and engageable with the other member for spreading said members apart from each other, an adjustable support connected with said upper member disposed transversely thereto, points extending outwardly from each side of said upper member adjacent said adjustable means, and a filter sack supported by said frame, the upper forward portion of said sack being open.

3. An air filtering appliance comprising a sack supporting frame, parts thereof being pivotally attached, a filter sack into which said frame extends and supports same, the forward end portion of said sack having an opening in its top, and means for expanding the sides of said frame laterally so that said appliance when inserted in an air duct is held in operative position by pressure of its sides against the opposite walls of said duct.

4. An air filtering appliance comprising a filter sack having an opening at one end thereof for the reception of air and an air outlet at its opposite end, a flap valve normally closing said air outlet disposed to be opened automatically by pressure of air in said sack, and a folding frame for said sack adapted to hold the walls of the sack distended, and being so formed that when the appliance is placed in operative position in an air duct said appliance receives support from the adjacent walls of the duct and the sack is held spaced from the walls of the duct to permit passage therebetween of air after having past through the walls of the sack.

ROBERT N. SHONER.